United States Patent [19]

Wiener et al.

[11] 4,372,085

[45] Feb. 8, 1983

[54] APPARATUS FOR FORM-GRINDING THE TOOTH-FLANKS OF A CYLINDRICAL GEARWHEEL

[75] Inventors: Dieter Wiener, Ettlingen; Gerd Sulzer, Wiggensbach-Simmlers, both of Fed. Rep. of Germany; Rudolf Skyba, deceased, late of Haldenwang-Börwang, Fed. Rep. of Germany, by Dorothea Skyba, legal representative; Jürgen Pomp, Kempten, Fed. Rep. of Germany

[73] Assignee: Liebherr-Verzahntechnik GmbH, Kempten, Fed. Rep. of Germany

[21] Appl. No.: 103,466

[22] Filed: Dec. 14, 1979

[30] Foreign Application Priority Data

Dec. 22, 1978 [DE] Fed. Rep. of Germany ....... 2855857

[51] Int. Cl.³ .................. B24B 47/26; B24B 1/00; B23F 1/02
[52] U.S. Cl. .................. 51/216 ND; 51/287
[58] Field of Search ........... 51/32, 52 R, 95 GH, 51/216 ND, 234, 287; 404/51

[56] References Cited

U.S. PATENT DOCUMENTS

| | | | |
|---|---|---|---|
| 2,292,588 | 8/1942 | Terbrueggen | 51/216 ND |
| 2,528,988 | 11/1950 | Aeppli | 51/216 ND X |
| 2,574,110 | 11/1951 | Kopec | 51/216 ND |
| 2,897,634 | 8/1959 | Wildhaber | 51/287 |
| 3,393,478 | 7/1968 | Fabish | 51/287 |
| 3,417,510 | 12/1968 | Wildhaber | 51/287 X |
| 3,577,683 | 5/1971 | Silvagi | 51/287 |

*Primary Examiner*—Harold D. Whitehead
*Assistant Examiner*—Robert A. Rose
*Attorney, Agent, or Firm*—Andrus, Sceales, Starke & Sawall

[57] ABSTRACT

In a process and apparatus for tooth-flank grinding of gearwheels, the opposing flanks of two adjacent teeth are initially ground simultaneously. In the terminal stages of the process, each flank is ground separately. A slight rocking motion of the gearwheel, provided by pivoted pawl in an indexing wheel, applies the grinding tool first to one tooth flank and then to the other. Any undesirable rounding off of the tooth flanks occurring during simultaneous tooth flank grinding can thus be corrected.

1 Claim, 6 Drawing Figures

APPARATUS FOR FORM-GRINDING THE TOOTH-FLANKS OF A CYLINDRICAL GEARWHEEL

The invention is directed to a process and apparatus for formgrinding the flanks of a spur cylindrical or helical gear-wheel using a grinding wheel having the profile of a tooth space being machined with simultaneous step-by-step radial feed of the grinding wheel and advance motion in the tooth direction.

The form-grinding of gears is in a number of different respects more useful than hobbing grinding currently widely used. One of its better effects is the higher machining rate so that the time needed for each workpiece is decreased.

The profile of the grinding wheel is the same as the negative tooth flank form and the workpiece, i.e. the gear, is made to take on this form without any generating effect, using an advancing motion in the tooth direction. For grinding the next flank the workpiece has to be turned through one tooth pitch.

With a grinding tool profiled on its two sides, it is possible for the two flanks of one tooth space to undergo grinding at the same time, feed being then radial in relation to the workpiece in the direction of the axis of symmetry of the tooth space. Because the amount of feed in the direction of the symmetry axis is equal, there will be, as measured normal to the tooth flank, different amounts machined as the grinding tool advances from the tooth tip to the tooth root if the flanks have a small radius of curvature. In each case a greater amount is machined away in a direction normal to the flank at the tooth tip than near the tooth root. At the root itself, because the tooth flanks have so far not been machined, a segment is machined away in each case, this segment being made up of the overall grinding oversize-amount or grinding allowance and the feed. These different feed amounts over the length of the tooth flanks have the bad effect that the face quality at the tooth root is different from that at the tooth tip and at the tooth root there is the danger of overheating or burning on grinding because a greater face of the grinding wheel is running against the work at a time.

The high forces produced, more specially, on grinding two flanks at a time, have the result that the system generally is deformed to a certain degree on grinding and such deforming in the system (made up of the grinding wheel, the machine and the work) may, on producing spur gears and, however, particularly on producing helical gears, be responsible for changes in the flank direction so that on grinding a rounded off flank may be produced. This loss in form is undesired because of the edge-loading caused by it which is responsible for undesired effects on load-takeup and the noise produced by the gearing.

In fact, in the case of two-flank grinding tooth barreling in the breadth-direction may only be produced by a further motion taking place radially in addition to the feed motion, such further motion causing more material (relieving) to be machined away from the tooth flank ends than in the middle of the flank. This further motion, undertaken as it is with only one form-grinding wheel, is responsible for distortion of the profile; it is only at one point that the tooth flank has a true profile it would have in theory. At the ends of the teeth a distortion has to be put up with, which is the same in effect as an error in the base-circle.

In a further grinding process, "a single-flank grinding" use is made of form-grinding bodies working on one side only. Single-flank grinding is responsible for a number of useful effects; for example the feed may be undertaken by turning the workpiece-gear through a small angle, the amount "a" run off on machining, measured in a direction normal to the tooth flank, being equal all over as a first approximation. The normal force between the grinding wheel and the tooth flank is kept in one direction and instability or hysteresis effects as on two-flank grinding do not come into being. Further useful effects produced on single-flank grinding are to be seen in the chance in making up for any difference in the tooth space width between, on the one hand, the dressing tool and, on the other hand, the gearwheel. The great shortcoming of single-flank grinding is, however, to be seen in the fact that it is slower, because each gear tooth flank has to be machined separately. Because the grinding time is certainly the most important aspect by far, and has in fact been responsible for the development of form-grinding so as to take over from hobbing or generating grinding as was normal some time back, two-flank grinding is generally more to be desired although, however, the shortcomings noted have necessarily to be put up with. For this reason single-flank grinding is only used when a high-quality level is needed, even although there is a representative increase in price because of the longer working times.

One purpose of the present invention is that of designing a form-grinding process of the type noted, which without any losses in the form of a longer grinding time, may be used for producing gearwheels of a higher quality than is the case with the two-flank grinding process.

For effecting these and other purposes in the process of the invention, the feed with respect to the last strokes before finish-grinding of a tooth space is produced by a small turning of the gearwheel about its axis firstly in the one and then in the other direction of turning, the tooth flanks being finish-machined separately. So it will be seen that there will be firstly a radial feed in the direction of the axis of symmetry of the tooth space, the outcome being the undesired effects such as, for example, rounded off grinding at the ends of the flanks. This flank error is then corrected by feed which is in a direction normal to the tooth flanks and which is produced by the necessary rotating of the gearwheel. So the useful effects of two-flank grinding, more specially, a shorter grinding time, are kept without producing the errors and undesired effects which are caused normally with this process.

Because the last stroke or strokes generally take place in a single-flank grinding operation stage, breadth-barreling may be produced without loss of profile by so undertaking the process that on machining the single tooth flanks at the time of the advancing motion of the grinding wheel, the workpiece is wobbled about its middle axis, normal to the axis of turning, about a middle position. On this basis, the same profile is produced in all sections.

A specially high face or surface quality may be produced if, on processing the separate tooth flanks at the time of feeding the grinding wheel, the last-named undergoes angular rotation in a forward direction in relation to the helix angle of the gearwheel by an amount of up to 5° and, more specially 2° to 3°. Although there has been an earlier suggestion to undertake single-flank grinding with an advance of about 10° in relation to the helical angle of the gearwheel, such a high advancing motion may not be generally used, making necessary as it does a different profile of the dressing tool and being responsible for high further forces in the direction of the wheel circumference.

The process of the invention is more specially undertaken with an apparatus having an indexing wheel coaxial with the gearwheel, the indexing wheel having indexing cutouts representative of the number of teeth of the gearwheel, for being acted upon by an indexing pawl. Such indexing locking systems are old. However, in the present invention the indexing pawl is made up of a lever tangential with respect to the indexing wheel, the lever having an indexing nose, which is moved lockingly into a cutout of the indexing wheel. The lever is bearinged at a point radially past the indexing part, and its free end is placed between two adjustable stops, which, starting from the resting middle position, are used for fixing two end positions of turning of the lever. The free end of the lever, on being advanced by an adjustment mechanism, is forced against the one stop and when the backward motion takes place, is forced against the other stop, and the indexing wheel is, in each case, turned through a certain desired angle.

If the tooth flanks of a tooth space are to be produced with different degrees of breadth-barreling, the stops may be joined up with the motion of the indexing wheel making use of different templates.

Taking a general view, it may be said that the process of the invention is responsible for producing the same useful effects as in two-flank form-grinding without its shortcomings.

An account will now be given of one example of the invention by way of example, making use of the figures.

Figure 1:
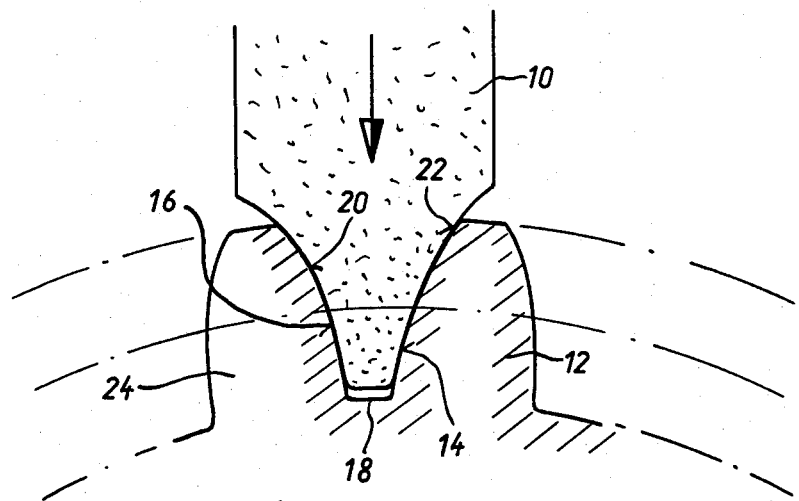
FIG. 1 is a diagrammatic view of a two-flank grinding wheel and associated gear wheel shortly before completing a tooth space in an old tooth flank grinding process.
Figure 3:
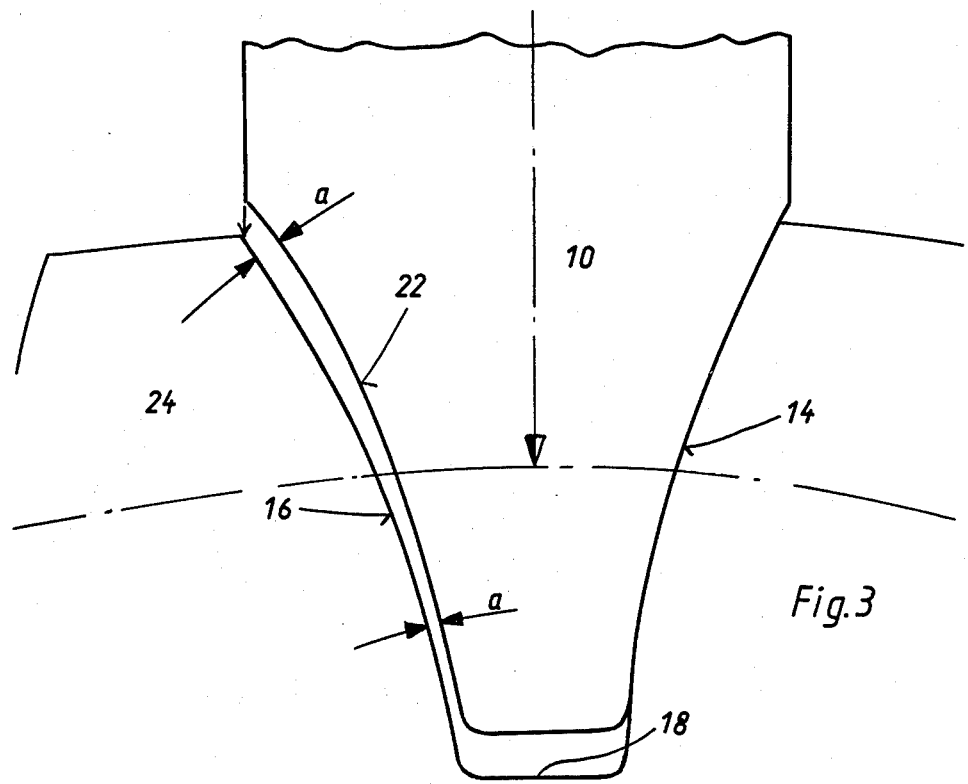
FIG. 3 is a rough diagrammatic view showing different feed amounts in the case of radial feed.

As will be clear from FIG. 1, in two-flank grinding, the feed of the grinding wheel 10 is in the arrowed direction radial in relation to the axis of the gearwheel 12. In this respect the gear flanks 14 and 16 and the between-teeth root face 18 are machined at the same time by the grinding wheel flanks 20, 22 of the grinding wheel 10. The amount "a" machined off along the dimension of a tooth 24 undergoes a great decrease towards the tooth root (FIG. 3).

Figure 4:
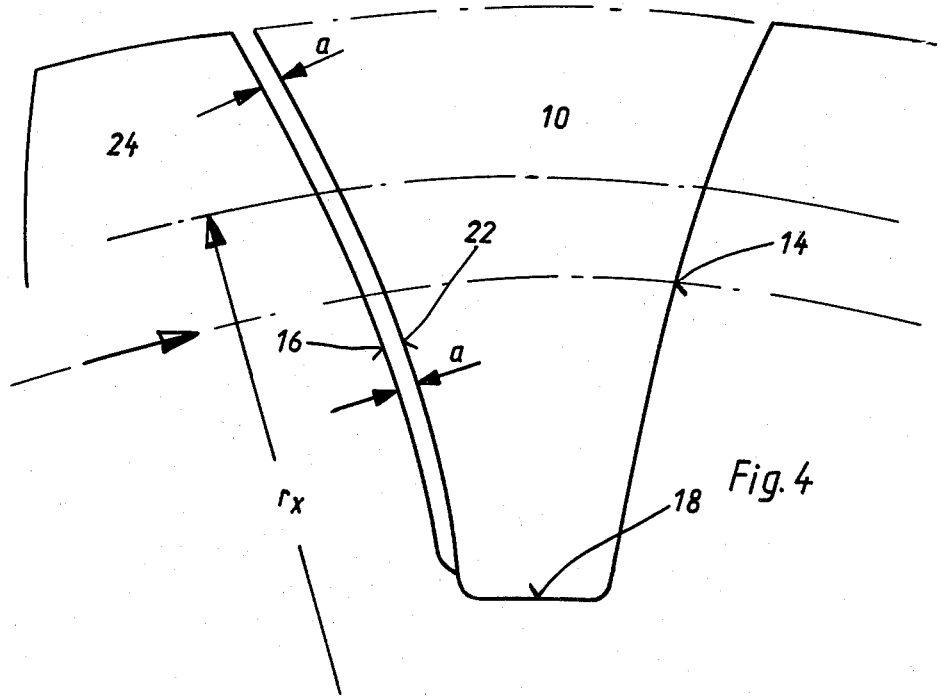
FIG. 4 is a rough diagrammatic view as in FIG. 3, the feed being normal to the tooth flank.

In single-flank grinding, the active profile of the grinding wheel 10 is only moved against one flank (14 in FIG. 4), while between the grinding wheel 10 and the tooth flank 16 there is a space. On feeding the gearwheel 12 by turning it about its axis, that is to say in the arrowed direction, the amount "a" of feed is generally equal (the amount "a" of feed changing with the radius, although, however, because the change in radius between the tooth root and the tooth tip is generally small, "a" may be taken as being equal or unchanging as a first approximation). An equal feed amount over the full height of the tooth flank is responsible for the same mechanical and heat loading, which, unlike the system of FIG. 3, is responsible for even face quality.

Figure 5:
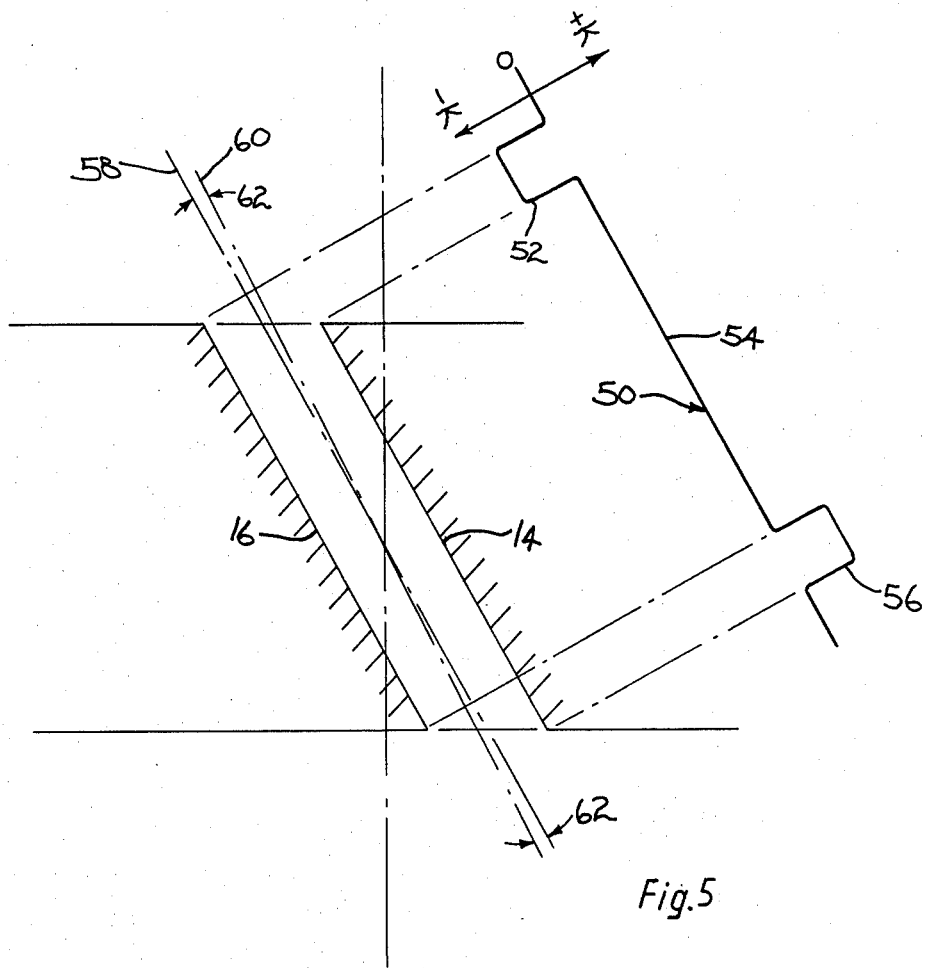
FIG. 5 is the view of a development of a section of two gear flanks, opposite each other, in helical gearing, changes in the amount of a normal force acting on the grinding wheel on grinding of the tooth space being projected on the development.

In FIG. 5 we have a diagrammatic view of the development of a section of two opposite tooth flanks 14, 16 in a helical gearing system, changes in the force normal to the tooth flanks in the case of two-flank grinding being projected on to the development by the graph labelled 50. A grinding wheel, which is moved through the tooth space and is used for two-flank grinding, firstly comes up against only the tooth flank 16 (when it comes out of the plane of the figure downwards) and, on further motion, it comes up against the tooth flank 16 and the tooth flank 14 till it is clear of the tooth flank 16 and then, lastly, comes in contact only with the tooth flank 14 until it clears gear wheel 12. Thus, for a short time after initially moving into the tooth space, the grinding wheel firstly undertakes single-flank grinding and then, on advancing through the tooth space, will undertake two-flank grinding and finally, on coming out of the tooth gap (or tooth space) will undertake single-flank grinding again. The changes in the tooth force K will be representative of this. As shown by the graph 50, the grinding wheel is firstly only acted upon on one side with the unbalanced normal force K52 and then, later, is acted upon by a force on both sides and, on moving out of the tooth gap, is acted upon by an unbalanced force so as to produce the balanced force 54 only on one side, that is to say on the opposite side from the side producing force 52. Because there is a limit to the stiffness of the machining system, there will be changes in position of the different parts which will be responsible for changes in the direction of the tooth, more specially, rounded off grinding of the flank at the edges.

FIG. 5 also shows the angular rotation of the grinding wheel with respect to the helix angle or direction of the teeth referred to above, line 58 indicating the helix angle of gearwheel 12, line 60 being the feed path of grinding wheel 10 and 62 being the angle of up to 5°, and preferably 2° to 3°.

Figure 2:
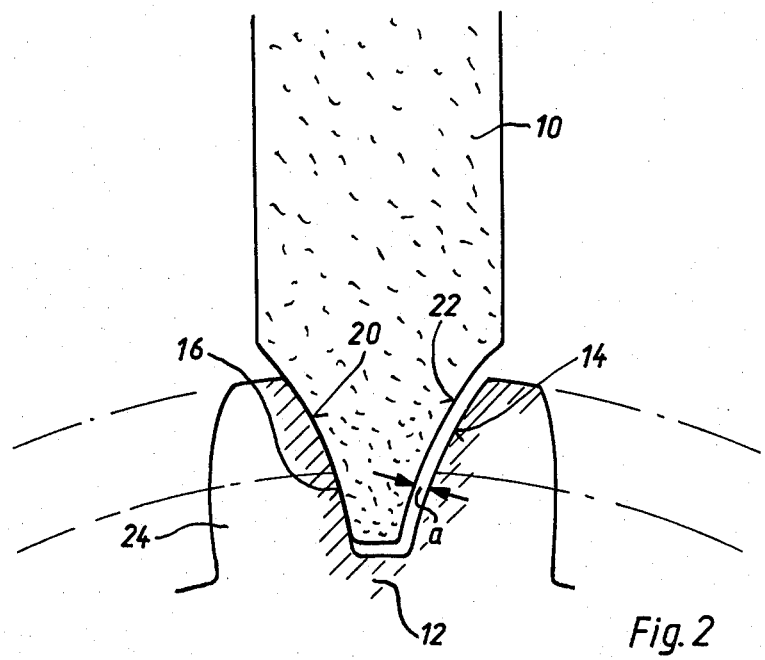
FIG. 2 is a diagrammatic view of a two-flank grinding wheel and associated gear wheel shortly before finishing a tooth space, the last feed being produced by turning of the gearwheel.

One stage of the process of the present invention is to be seen in FIG. 2. The tooth space has been first-stage machined almost up to the finish-size using two-flank grinding. In this respect the grinding wheel 10 is in a middle position in relation to the gear tooth space. For the last stroke or strokes, by turning the gearwheel 12 by a small amount, firstly the tooth flank 16 undergoes finish-grinding on one flank and, by turning in the opposite direction, the tooth flank 14 of the tooth space undergoes finish-grinding. The amount "a" of feed is, in this respect, the same as for the full flank height.

The same steps are undertaken on dressing the grinding wheel. The main amount of dressing is undertaken by tooth-like operation using radial feed of the grinding wheel. Fine dressing takes place with separate, single-flank turning up for the right and the left flanks.

Figure 6:
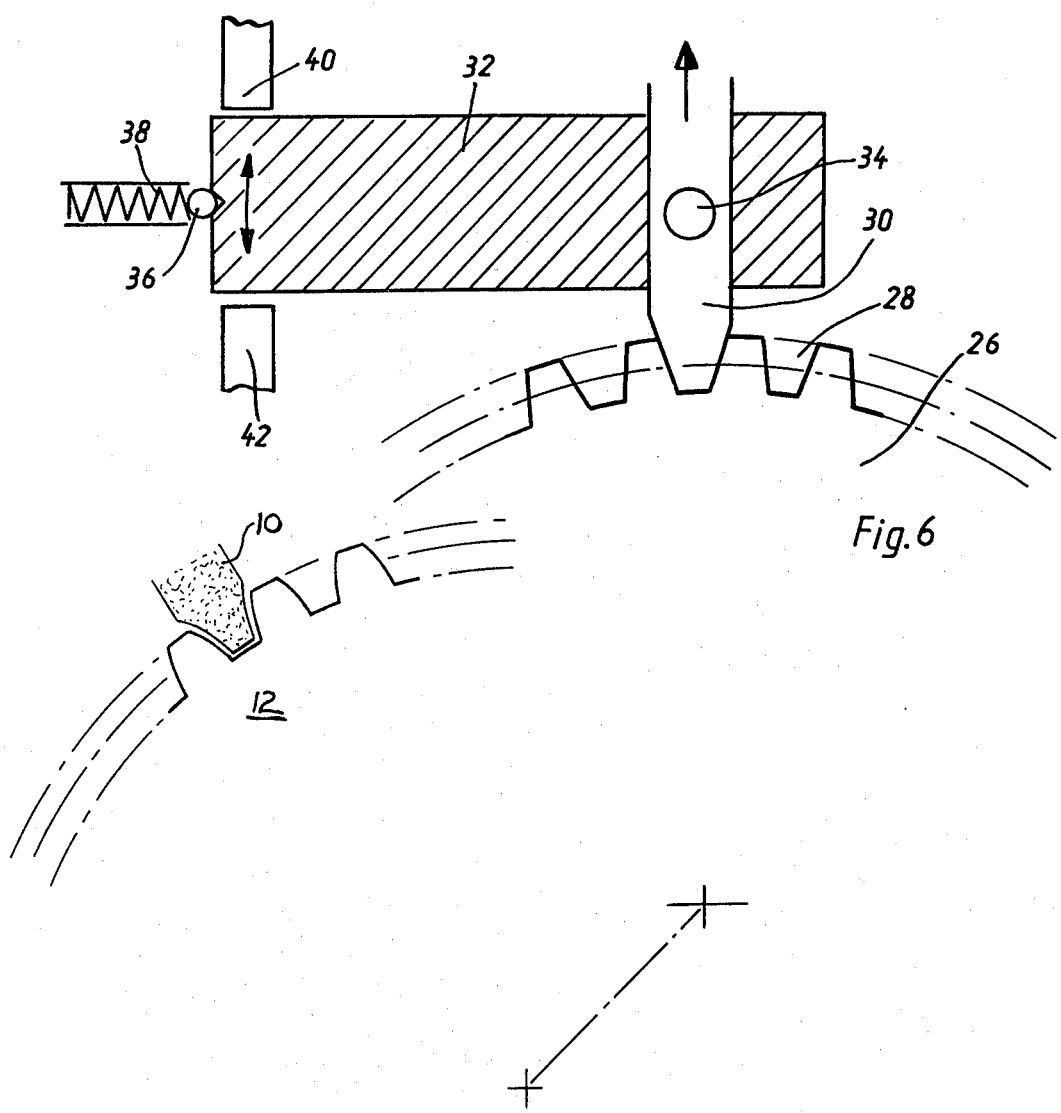
FIG. 6 is a rough diagrammatic view of the indexing pawl for a typical turning of the indexing wheel and of the gearwheel.

The turning of the gearwheel may be undertaken using the indexing system of FIG. 6, in which an indexing wheel 26 is to be seen, whose cutouts are representative in number with the number of teeth of the gear wheel 12. Indexing wheel 26 is placed on the same axis as gear wheel 12, as shown in FIG. 6. An indexing nose 30 is locked into the indexing wheel 26 and for indexing it is, in each case, pulled clear of the cutout 28 in the arrowed direction. This locking and unlocking is produced by an apparatus, not to be seen in the figures, using teachings old in the art.

The indexing nose 30 is guided in a lever 32 which, for its part, may be turned about the turning-point 34. On the first stage of grinding of the tooth space, the lever 32 is locked using a ball 36 and a spring 38 in a middle position.

On finish-grinding of a gearwheel, the lever 32 is firstly turned about turning point 34, using a mechanical system, not to be seen in the figure, against the adjustable stop 40 and, in this position, one flank of the gearwheel undergoes finish-grinding, and on backward motion against the adjustable stop 42, finish-grinding of the other tooth flank takes place.

Running up the lever 32 against one of the stops 40 or 42 is responsible for turning the indexing wheel 26. The gearwheel 12, joined with it, is, for this reason, turned through the feed amount for the right and for the left flank. If the lever 32 is not forced against unmoving adjustable stops 40 and 42, but against templates, which, for their part, are designed for being moved with the table or the grinding wheel, it is possible, in a simple way, for the right hand and left hand flanks to be produced with different breadth-barreling.

Because, generally, the dressing of the grinding wheel takes place in a different carriage position to the grinding of the gearwheel, it is possible, making use of these templates, for different thicknesses of the grinding wheel to be turned out as well.

If for the grinding wheel a dressing tool is used which has the three-dimensional form of at least one tooth space, whose flanks are covered with diamond-coated tape, it is possible for differences in the tape thickness to be made good by different feed amounts in the single-flank grinding stage without, in this respect, having any undesired effects on the tooth form.

In the single-flank grinding phase furthermore tooth width correction is possible, with which the base-circle error may be compensated. If the grinding wheel profile is produced with a certain distance between the axes of the dressing tool and the grinding wheel, on grinding the work gearwheel with the same axis-to-axis distance, the same profile will be produced on the work as on the dressing tool. If on grinding the work a small change is made in the axis-to-axis distance, a base-circle error will be produced and a different tooth space width will be produced. The changing in the last-named may undergo correction in the single-flank grinding phase so that the work will only have the change in the base-circle. This fact may be used, for example, for producing, in relation to the dressing tool, a correction in the base-circle and a correction, in connection with this, of the mating or meshing angle. On making the necessary development of the system, the correction may be undertaken for the right and left hand flanks separately.

We claim:

1. Apparatus for use in producing spur cylindrical or helical cylindrical gearwheels by form-grinding the flanks of the gear teeth with a grinding wheel having a profile of the tooth space between adjacent teeth of the gearwheel, the grinding wheel initially being simultaneously applied to both flanks of a given gear tooth and thereafter being separately applied to each of the flanks, said apparatus comprising:

a rotatable indexing wheel (26) couplable to the gearwheel (12) generally coaxially therewith, said indexing wheel having cutouts (28) equal in number to the tooth number desired on the gearwheel;

indexing pawl means operatively associated with said indexing wheel and including, an indexing nose (30) radially movable into and out of engagement with said cutouts of said indexing wheel, a lever (32) positioned generally tangentially with respect to said indexing wheel, said lever having an end receiving said indexing nose and pivoted at a point radially beyond the point of engagement of said indexing nose and indexing wheel, said lever having a free end arcuately movable for reciprocally rotating the indexing wheel and gearwheel to separately apply the grinding wheel to each flank of the gear tooth, a pair of adjustable stops (40, 42) operatively associated with the free end of said lever for limiting the arcuate movement of said free end of said lever and of said indexing nose for defining the amount of rotation of said indexing wheel and gearwheel; and means (36, 38) for releasably retaining said lever in a central position intermediate the limits of arcuate movement of said free end in which the indexing wheel positions the gearwheel for simultaneous application of the grinding wheel to both flanks of the gear tooth.

* * * * *